United States Patent
Perez

(10) Patent No.: US 9,491,511 B2
(45) Date of Patent: *Nov. 8, 2016

(54) VIDEO-ON-DEMAND CONTENT DELIVERY METHOD FOR PROVIDING VIDEO-ON-DEMAND SERVICES TO TV SERVICE SUBSCRIBERS

(71) Applicant: Broadband iTV, Inc., Honolulu, HI (US)

(72) Inventor: Milton Diaz Perez, Tiburon, CA (US)

(73) Assignee: Broadband iTV, Inc., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,953

(22) Filed: Dec. 22, 2015

(65) Prior Publication Data

US 2016/0112754 A1  Apr. 21, 2016

Related U.S. Application Data

(60) Continuation of application No. 14/706,721, filed on May 7, 2015, now Pat. No. 9,338,511, which is a continuation of application No. 12/852,663, filed on Aug. 9, 2010, now Pat. No. 9,078,016, which is a (Continued)

(51) Int. Cl.
*H04N 5/445* (2011.01)
*H04N 7/173* (2011.01)

(Continued)

(52) U.S. Cl.
CPC ........ *H04N 21/47202* (2013.01); *G06Q 30/02* (2013.01); *H04N 7/17318* (2013.01);

(Continued)

(58) Field of Classification Search
USPC .................................................. 725/74–104
See application file for complete search history.

(56) References Cited

U.S. PATENT DOCUMENTS 4,706,121 A   11/1987 Young
5,479,268 A   12/1995 Young et al.
(Continued)

FOREIGN PATENT DOCUMENTS

EP   1 164 796 A1   12/2001
EP   1 361 759 A1   11/2003
(Continued)

OTHER PUBLICATIONS

International Search Report, dated Mar. 6, 2006, in PCT International Application US2005/027376, of Broadband iTV, Inc.

(Continued)

*Primary Examiner* — Mushfikh Alam
(74) *Attorney, Agent, or Firm* — Amster, Rothstein & Ebenstein LLP

(57) ABSTRACT

A video-on-demand (VOD) content delivery system has a VOD Application Server which manages a database of templates ordered in a hierarchy for presentation of video content elements of different selected types categorized in hierarchical order. The templates include those for higher-order displays which have one or more links to lower-order displays of specific content. The VOD Application Server, in response to viewer request, displays a high-order templatized display, and in response to viewer selection of a link, displays the lower-order display of specific content. A web-based Content Management System receives content uploaded online in file formats with metadata for title and topical area, and automatically converts it into video data format compatible with the VOD content delivery system indexed by title and topical area. A User Interface for the system delivers listings data to the viewer's TV indexed by title and topical area specified by the uploaded metadata.

14 Claims, 7 Drawing Sheets

VOD Content Delivery System, Overall Architecture

Drill Down Navigation Example

Related U.S. Application Data division of application No. 11/952,552, filed on Dec. 7, 2007, now Pat. No. 7,774,819, which is a division of application No. 10/909,192, filed on Jul. 30, 2004, now Pat. No. 7,590,997.

(51) Int. Cl.

| | | |
|---|---|---|
| H04N 7/16 | (2011.01) | |
| G06F 3/00 | (2006.01) | |
| G06F 13/00 | (2006.01) | |
| H04N 21/472 | (2011.01) | |
| G06Q 30/02 | (2012.01) | |
| H04N 21/2547 | (2011.01) | |
| H04N 21/258 | (2011.01) | |
| H04N 21/2743 | (2011.01) | |
| H04N 21/431 | (2011.01) | |
| H04N 21/4722 | (2011.01) | |
| H04N 21/482 | (2011.01) | |
| H04N 21/81 | (2011.01) | |
| H04N 21/84 | (2011.01) | |
| H04N 21/858 | (2011.01) | |
| H04N 21/235 | (2011.01) | |
| H04N 21/61 | (2011.01) | |
| H04N 21/422 | (2011.01) | |
| H04N 21/643 | (2011.01) | |
| H04N 21/254 | (2011.01) | |
| H04N 21/4627 | (2011.01) | |
| H04N 21/262 | (2011.01) | |

(52) U.S. Cl.
CPC ........ *H04N21/235* (2013.01); *H04N 21/2541* (2013.01); *H04N 21/2547* (2013.01); *H04N 21/25858* (2013.01); *H04N 21/25891* (2013.01); *H04N 21/26225* (2013.01); *H04N 21/2743* (2013.01); *H04N 21/42204* (2013.01); *H04N 21/4312* (2013.01); *H04N 21/4314* (2013.01); *H04N 21/4627* (2013.01); *H04N 21/4722* (2013.01); *H04N 21/482* (2013.01); *H04N 21/6125* (2013.01); *H04N 21/6175* (2013.01); *H04N 21/64322* (2013.01); *H04N 21/812* (2013.01); *H04N 21/84* (2013.01); *H04N 21/858* (2013.01)

(56) References Cited

U.S. PATENT DOCUMENTS

| | | |
|---|---|---|
| 5,550,735 A | 8/1996 | Slade et al. |
| 5,589,892 A | 12/1996 | Knee et al. |
| 5,594,936 A | 1/1997 | Rebec et al. |
| 5,648,824 A | 7/1997 | Dunn et al. |
| 5,686,954 A | 11/1997 | Yoshinobu et al. |
| 5,721,827 A | 2/1998 | Logan et al. |
| 5,734,853 A | 3/1998 | Hendricks et al. |
| 5,758,258 A | 5/1998 | Shoff et al. |
| 5,759,101 A | 6/1998 | Von Kohorn |
| 5,790,176 A | 8/1998 | Craig |
| 5,798,785 A | 8/1998 | Hendricks et al. |
| 5,812,123 A | 9/1998 | Rowe et al. |
| 5,813,014 A | 9/1998 | Gustman |
| 5,826,102 A | 10/1998 | Escobar |
| 5,832,499 A | 11/1998 | Gustman |
| 5,850,218 A | 12/1998 | LaJoie et al. |
| 5,859,898 A | 1/1999 | Checco |
| 5,867,821 A | 2/1999 | Ballantyne |
| 5,892,536 A | 4/1999 | Logan et al. |
| 5,914,746 A | 6/1999 | Matthews |
| 5,926,230 A | 7/1999 | Niijima et al. |
| 5,931,901 A | 8/1999 | Wolfe |
| 5,956,716 A | 9/1999 | Kenner et al. |
| 5,991,801 A | 11/1999 | Rebec et al. |
| 6,005,561 A | 12/1999 | Hawkins et al. |
| 6,008,803 A | 12/1999 | Rowe et al. |
| 6,025,837 A | 2/2000 | Matthews et al. |
| 6,038,591 A | 3/2000 | Wolfe |
| 6,049,823 A | 4/2000 | Hwang |
| 6,088,455 A | 7/2000 | Logan et al. |
| 6,092,080 A | 7/2000 | Gustman |
| 6,100,883 A | 8/2000 | Hoarty |
| 6,118,442 A | 9/2000 | Tanigawa |
| 6,148,081 A | 11/2000 | Szymanski et al. |
| 6,161,142 A | 12/2000 | Wolfe |
| 6,177,931 B1 | 1/2001 | Alexander et al. |
| 6,205,582 B1 | 3/2001 | Hoarty |
| 6,237,146 B1 | 5/2001 | Richards |
| 6,269,275 B1 | 7/2001 | Slade |
| 6,289,346 B1 | 9/2001 | Milewski et al. |
| 6,305,016 B1 | 10/2001 | Marshall et al. |
| 6,317,885 B1 | 11/2001 | Fries |
| 6,357,042 B2 | 3/2002 | Srinivasan |
| 6,539,548 B1 | 3/2003 | Hendricks et al. |
| 6,546,393 B1 | 4/2003 | Khan |
| 6,564,380 B1 | 5/2003 | Murphy |
| 6,738,978 B1 | 5/2004 | Hendricks |
| 6,754,904 B1* | 6/2004 | Cooper ............... G06Q 10/10 348/E7.071 |
| 6,774,926 B1 | 8/2004 | Ellis et al. |
| 6,804,825 B1 | 10/2004 | White et al. |
| 6,834,110 B1 | 12/2004 | Marconcini et al. |
| 6,845,396 B1 | 1/2005 | Kanojia et al. |
| 6,898,762 B2 | 5/2005 | Ellis et al. |
| 6,931,451 B1 | 8/2005 | Logan et al. |
| 6,990,677 B1 | 1/2006 | Pietraszak et al. |
| 7,028,327 B1 | 4/2006 | Dougherty et al. |
| 7,055,166 B1 | 5/2006 | Logan et al. |
| 7,058,223 B2 | 6/2006 | Cox |
| 7,065,709 B2 | 6/2006 | Ellis |
| 7,076,734 B2 | 7/2006 | Wolff et al. |
| 7,089,309 B2 | 8/2006 | Ramaley et al. |
| 7,100,185 B2 | 8/2006 | Bennington et al. |
| 7,103,905 B2* | 9/2006 | Novak ............... H04N 7/17318 348/E7.071 |
| 7,103,906 B1 | 9/2006 | Katz et al. |
| 7,120,925 B2 | 10/2006 | D'Souza et al. |
| 7,155,674 B2 | 12/2006 | Breen et al. |
| 7,200,575 B2 | 4/2007 | Hans et al. |
| 7,213,005 B2 | 5/2007 | Mourad et al. |
| 7,222,163 B1 | 5/2007 | Girouard et al. |
| 7,225,455 B2 | 5/2007 | Bennington et al. |
| 7,269,854 B2 | 9/2007 | Simmons et al. |
| 7,277,870 B2 | 10/2007 | Mourad et al. |
| 7,305,691 B2 | 12/2007 | Cristofalo |
| 7,308,413 B1 | 12/2007 | Tota et al. |
| 7,337,462 B2 | 2/2008 | Dudkiewicz et al. |
| 7,367,043 B2* | 4/2008 | Dudkiewicz ...... G06F 17/30017 348/E5.006 |
| 7,386,512 B1 | 6/2008 | Allibhoy et al. |
| 7,392,532 B2 | 6/2008 | White et al. |
| 7,426,558 B1 | 9/2008 | Allibhoy et al. |
| 7,444,402 B2* | 10/2008 | Rennels ............... H04H 20/31 709/219 |
| 7,471,834 B2 | 12/2008 | Sull et al. |
| 7,493,643 B2 | 2/2009 | Ellis |
| 7,516,472 B2 | 4/2009 | Danker et al. |
| 7,548,565 B2 | 6/2009 | Sull et al. |
| 7,590,997 B2 | 9/2009 | Diaz Perez |
| 7,594,245 B2 | 9/2009 | Sezan et al. |
| 7,606,883 B1 | 10/2009 | Allibhoy et al. |
| 7,624,337 B2 | 11/2009 | Sull et al. |
| 7,631,336 B2 | 12/2009 | Diaz Perez |
| 7,644,429 B2 | 1/2010 | Bayassi et al. |
| 7,650,621 B2 | 1/2010 | Thomas et al. |
| 7,690,020 B2 | 3/2010 | Lebar |
| 7,720,707 B1 | 5/2010 | Mowry |
| 7,761,899 B2 | 7/2010 | Buehl et al. |
| 7,774,819 B2 | 8/2010 | Perez |
| 7,835,920 B2 | 11/2010 | Snyder et al. |
| 7,908,626 B2 | 3/2011 | Williamson et al. |
| 7,917,933 B2* | 3/2011 | Thomas ............... G06F 3/0481 725/87 |

(56) References Cited

U.S. PATENT DOCUMENTS

| | | | |
|---|---|---|---|
| 7,921,448 B2 | 4/2011 | Fickle et al. | |
| 7,926,079 B2 | 4/2011 | Lebar | |
| 7,945,929 B2 | 5/2011 | Knudson et al. | |
| 7,962,414 B1 | 6/2011 | Allibhoy et al. | |
| 7,974,962 B2 | 7/2011 | Krakirian et al. | |
| 7,987,492 B2 * | 7/2011 | Liwerant | H04M 3/567 725/105 |
| 8,006,263 B2 | 8/2011 | Ellis et al. | |
| 8,010,988 B2 | 8/2011 | Cox | |
| 8,020,187 B2 | 9/2011 | Cox | |
| 8,042,132 B2 * | 10/2011 | Carney | G06Q 30/02 709/217 |
| 8,090,605 B2 | 1/2012 | Tota et al. | |
| 8,112,776 B2 | 2/2012 | Schein et al. | |
| 8,151,290 B1 | 4/2012 | Ujihara | |
| 8,191,098 B2 | 5/2012 | Cooper et al. | |
| 8,205,237 B2 | 6/2012 | Cox | |
| 8,214,254 B1 | 7/2012 | Mowry | |
| 8,219,446 B1 | 7/2012 | Mowry | |
| 8,249,924 B1 | 8/2012 | Mowry | |
| 8,340,994 B2 | 12/2012 | Tota et al. | |
| 8,346,605 B2 | 1/2013 | Krikorian et al. | |
| 8,365,230 B2 | 1/2013 | Chane et al. | |
| 8,434,118 B2 * | 4/2013 | Gonder | H04L 29/06027 725/87 |
| 8,464,302 B1 | 6/2013 | Liwerant et al. | |
| 8,473,868 B1 | 6/2013 | Kauffman | |
| 8,479,246 B2 | 7/2013 | Hudson et al. | |
| 8,644,354 B2 | 2/2014 | George et al. | |
| 8,707,354 B1 | 4/2014 | Moreau et al. | |
| 8,843,978 B2 | 9/2014 | Hardin | |
| 8,997,136 B2 | 3/2015 | Brooks et al. | |
| 9,055,325 B2 | 6/2015 | Gaydou et al. | |
| 9,066,118 B2 | 6/2015 | Diaz Perez | |
| 9,078,016 B2 | 7/2015 | Diaz Perez | |
| 9,106,959 B2 | 8/2015 | Diaz Perez | |
| 9,113,228 B2 | 8/2015 | Diaz Perez | |
| 9,232,275 B2 | 1/2016 | Perez | |
| 2001/0018771 A1 | 8/2001 | Walker et al. | |
| 2001/0033736 A1 | 10/2001 | Yap | |
| 2001/0049625 A1 | 12/2001 | Mowry | |
| 2001/0052132 A1 | 12/2001 | Fryer | |
| 2002/0056104 A1 | 5/2002 | Burnhouse et al. | |
| 2002/0059621 A1 * | 5/2002 | Thomas | G06F 3/0481 725/87 |
| 2002/0066106 A1 | 5/2002 | Kanojia et al. | |
| 2002/0069218 A1 | 6/2002 | Sull et al. | |
| 2002/0078456 A1 | 6/2002 | Hudson | |
| 2002/0083451 A1 | 6/2002 | Gill et al. | |
| 2002/0087661 A1 | 7/2002 | Matichuk et al. | |
| 2002/0088009 A1 | 7/2002 | Dukiewicz et al. | |
| 2002/0088010 A1 * | 7/2002 | Dudkiewicz | G06F 17/30017 725/138 |
| 2002/0092019 A1 | 7/2002 | Marcus | |
| 2002/0104099 A1 * | 8/2002 | Novak | H04N 7/17318 725/136 |
| 2002/0120925 A1 | 8/2002 | Logan | |
| 2002/0138843 A1 | 9/2002 | Samaan et al. | |
| 2002/0138844 A1 | 9/2002 | Otenasek | |
| 2002/0147975 A1 | 10/2002 | Seo | |
| 2002/0152224 A1 | 10/2002 | Roth et al. | |
| 2002/0152318 A1 | 10/2002 | Menon et al. | |
| 2002/0163532 A1 | 11/2002 | Thomas et al. | |
| 2002/0174430 A1 | 11/2002 | Ellis et al. | |
| 2002/0184634 A1 | 12/2002 | Cooper | |
| 2002/0184635 A1 | 12/2002 | Istvan | |
| 2002/0194194 A1 * | 12/2002 | Fenton | G06F 17/3089 |
| 2003/0009542 A1 | 1/2003 | Kasal et al. | |
| 2003/0018971 A1 | 1/2003 | McKenna | |
| 2003/0037010 A1 * | 2/2003 | Schmelzer | G06F 17/30026 705/67 |
| 2003/0055893 A1 | 3/2003 | Sato et al. | |
| 2003/0084126 A1 * | 5/2003 | Kumar | G06Q 30/02 709/219 |
| 2003/0084449 A1 | 5/2003 | Chane et al. | |
| 2003/0093790 A1 | 5/2003 | Logan et al. | |
| 2003/0101451 A1 | 5/2003 | Bentolila et al. | |
| 2003/0149975 A1 | 8/2003 | Eldering et al. | |
| 2003/0154128 A1 | 8/2003 | Liga | |
| 2003/0154475 A1 | 8/2003 | Rodriguez et al. | |
| 2003/0167449 A1 | 9/2003 | Warren | |
| 2003/0167471 A1 | 9/2003 | Roth et al. | |
| 2003/0191816 A1 | 10/2003 | Landress | |
| 2003/0204856 A1 | 10/2003 | Buxton | |
| 2003/0208756 A1 | 11/2003 | Macrae et al. | |
| 2003/0226150 A1 | 12/2003 | Berberet | |
| 2003/0234819 A1 | 12/2003 | Daly | |
| 2004/0015989 A1 | 1/2004 | Kaizu et al. | |
| 2004/0015998 A1 | 1/2004 | Bokor | |
| 2004/0049788 A1 | 3/2004 | Mori et al. | |
| 2004/0073919 A1 | 4/2004 | Gutta et al. | |
| 2004/0078825 A1 | 4/2004 | Murphy | |
| 2004/0103120 A1 * | 5/2004 | Fickle | G06Q 10/10 |
| 2004/0117844 A1 | 6/2004 | Karaoguz et al. | |
| 2004/0133918 A1 | 7/2004 | Danker | |
| 2004/0136698 A1 | 7/2004 | Mock | |
| 2004/0148626 A1 | 7/2004 | Sakao et al. | |
| 2004/0158855 A1 | 8/2004 | Gu et al. | |
| 2004/0172419 A1 | 9/2004 | Morris et al. | |
| 2004/0205816 A1 | 10/2004 | Barrett | |
| 2004/0268250 A1 | 12/2004 | Danker | |
| 2004/0268413 A1 | 12/2004 | Reid et al. | |
| 2005/0044577 A1 | 2/2005 | Jerding | |
| 2005/0049933 A1 | 3/2005 | Upendran et al. | |
| 2005/0050218 A1 | 3/2005 | Sheldon | |
| 2005/0081237 A1 | 4/2005 | Chen | |
| 2005/0097622 A1 | 5/2005 | Zigmond et al. | |
| 2005/0097623 A1 | 5/2005 | Tecot | |
| 2005/0138560 A1 | 6/2005 | Lee et al. | |
| 2005/0149987 A1 | 7/2005 | Boccon-Gibod et al. | |
| 2005/0154679 A1 | 7/2005 | Bielak | |
| 2005/0160458 A1 | 7/2005 | Baumgartner | |
| 2005/0160465 A1 | 7/2005 | Walker | |
| 2005/0166230 A1 | 7/2005 | Gaydou et al. | |
| 2005/0188415 A1 | 8/2005 | Riley | |
| 2005/0193015 A1 | 9/2005 | Logston | |
| 2005/0203918 A1 | 9/2005 | Holbrook | |
| 2005/0210524 A1 | 9/2005 | Dolph | |
| 2005/0229209 A1 | 10/2005 | Hildebolt et al. | |
| 2005/0235318 A1 | 10/2005 | Grauch et al. | |
| 2005/0235319 A1 | 10/2005 | Carpenter et al. | |
| 2005/0239546 A1 | 10/2005 | Hedrick | |
| 2005/0240961 A1 | 10/2005 | Jerding et al. | |
| 2005/0246752 A1 | 11/2005 | Liwerant et al. | |
| 2005/0283800 A1 | 12/2005 | Ellis et al. | |
| 2005/0289151 A1 | 12/2005 | Burke | |
| 2006/0004914 A1 | 1/2006 | Kelly et al. | |
| 2006/0015925 A1 | 1/2006 | Logan | |
| 2006/0029093 A1 | 2/2006 | Van Rossum | |
| 2006/0085830 A1 | 4/2006 | Bruck et al. | |
| 2006/0123455 A1 | 6/2006 | Pai | |
| 2006/0155850 A1 | 7/2006 | Ma et al. | |
| 2006/0174260 A1 | 8/2006 | Gutta | |
| 2006/0267995 A1 | 11/2006 | Radloff et al. | |
| 2007/0016530 A1 | 1/2007 | Stasi et al. | |
| 2007/0157221 A1 | 7/2007 | Ou et al. | |
| 2007/0157249 A1 | 7/2007 | Cordray et al. | |
| 2007/0198532 A1 * | 8/2007 | Krikorian | G06Q 30/0273 705/14.69 |
| 2007/0214482 A1 | 9/2007 | Nguyen | |
| 2007/0245399 A1 | 10/2007 | Espelien | |
| 2007/0250864 A1 | 10/2007 | Diaz Perez | |
| 2008/0022298 A1 | 1/2008 | Cavicchia | |
| 2008/0072260 A1 | 3/2008 | Rosin et al. | |
| 2008/0127257 A1 | 5/2008 | Kvache | |
| 2008/0141325 A1 | 6/2008 | Ludvig et al. | |
| 2008/0148317 A1 | 6/2008 | Opaluch | |
| 2008/0163292 A1 | 7/2008 | Stallworth | |
| 2008/0163330 A1 | 7/2008 | Sparrell | |
| 2008/0189749 A1 | 8/2008 | White et al. | |
| 2008/0222687 A1 | 9/2008 | Edry | |
| 2009/0158334 A1 | 6/2009 | Rodriguez et al. | |
| 2010/0138863 A1 | 6/2010 | Diaz Perez | |
| 2010/0153999 A1 | 6/2010 | Yates | |

(56) References Cited

U.S. PATENT DOCUMENTS

| | | |
|---|---|---|
| 2010/0211975 A1 | 8/2010 | Boyer et al. |
| 2010/0319040 A1 | 12/2010 | Diaz Perez |
| 2010/0325655 A1 | 12/2010 | Perez |
| 2011/0030012 A1 | 2/2011 | Diaz Perez |
| 2011/0030013 A1 | 2/2011 | Diaz Perez |
| 2013/0125158 A1 | 5/2013 | Brown |
| 2013/0254804 A1 | 9/2013 | Diaz Perez |
| 2013/0254809 A1 | 9/2013 | Diaz Perez |
| 2013/0254814 A1 | 9/2013 | Diaz Perez |
| 2015/0128192 A1 | 5/2015 | Diaz Perez |
| 2015/0237403 A1 | 8/2015 | Perez |
| 2015/0245099 A1 | 8/2015 | Perez |
| 2015/0264440 A1 | 9/2015 | Perez |
| 2015/0281792 A1 | 10/2015 | Gaydou et al. |
| 2015/0358649 A1 | 12/2015 | Perez |
| 2015/0358682 A1 | 12/2015 | Perez |
| 2015/0358683 A1 | 12/2015 | Perez |

FOREIGN PATENT DOCUMENTS

| | | |
|---|---|---|
| IE | WO0138960 | 5/2001 |
| JP | 07-284035 | 10/1995 |
| JP | 11-150692 | 6/1999 |
| JP | 03-116121 | 4/2003 |
| WO | 9406084 A1 | 3/1994 |
| WO | 99/10822 A1 | 3/1999 |
| WO | 99/41684 A1 | 8/1999 |
| WO | 9950778 A1 | 10/1999 |
| WO | 01/10124 A1 | 2/2001 |
| WO | 01/10127 A1 | 2/2001 |
| WO | WO0122688 | 3/2001 |
| WO | 0208948 A2 | 1/2002 |
| WO | 03/052572 A1 | 6/2003 |
| WO | WO03052572 | 6/2003 |
| WO | WO03069457 | 8/2003 |

OTHER PUBLICATIONS

International Search Report, dated Sep. 15, 2009, in PCT International Application US2008/003341, of Broadband iTV, Inc.
International Search Report, dated Nov. 28, 2008, in PCT International Application US2008/007980, of Broadband iTV, Inc.
The Industry Standard, "Web Entertainment Gets Personal", Jan. 10, 2000, www.thestandard.com.
Affidavit of Milton Diaz Perez Under C.F.R. 132, Mar. 9, 2009, submitted in U.S. Appl. No. 10/909,192, filed Jul. 3, 2004.
Affidavit of Milton Diaz Perez, Ex. A, Wikipedia, "Cable Television in the United States", history, last modified Jan. 17, 2009, pp. 1-7, http://en.wikipedia.org/wiki/Cable_Television_in_the_United_States.
Affidavit of Milton Diaz Perez, Ex. B, Wikipedia, "Internet Television", history, last modified Feb. 5, 2009, pp. 1-4, http://en.wikipedia.org/wiki/Internet_TV.
Affidavit of Milton Diaz Perez, Ex. C, Wikipedia, "Content Delivery Network", history, last modified Feb. 10, 2009, pp. 1-6, http://en.wikipedia.org/wiki/Content_Delivery_Network.
Affidavit of Milton Diaz Perez, Ex. D, Wikipedia, "Walled Garden (technology)", history, last modified Feb. 3, 2009, pp. 1-2, http://en.wikipedia.org/wiki/Walled_Garden_(technology).
Affidavit of Milton Diaz Perez, Ex. E, Wikipedia, "User-generated TV", history, last modified Feb. 10, 2009, pp. 1-2, http://en.wikipedia.org/wiki/User-generated_TV.
Affidavit of Milton Diaz Perez, Ex. E1, Wikipedia, "ZeD", history, last modified Jan. 5, 2009, pp. 1-7, http://en.wikipedia.org/wiki/ZeD.
Affidavit of Milton Diaz Perez, Ex. E2, Wikipedia, "Current TV", history, last modified Feb. 5, 2009, pp. 1-5, http://en.wikipedia.org/wiki/Current_TV.
Affidavit of Milton Diaz Perez, Ex. E3, OUTLOUD.TV, tripatlas, circa 2003, http://tripatlas.com/Outloud.tv.
VOD Metadata—Project Primer, Overview of VOD Content Specification 1.0, 1.1, and 2.0, published by Cable Labs, circa 2002-2007, http://www.cablelabs.com/projects/metadata/primer.
xOD Capsule, issue dated Apr. 11, 2006, includes article "Bresnan Taps CMC for VOD", published by Communications, Engineering & Design Magazine, http://www.cedmagazine.com/newsletter.aspx?id=67468.
Comcast Media Center, Content Gateway, Content Distribution website, circa 2010, http://www.comcastmediacenter.com/content-gateway.
Petition for Inter Partes Review, IPR2014-01222, *Unified Patents, Inc.* v. *Broadband iTV, Inc.*, re U.S. Pat. No. 7,631,336.
Petition for Covered Business Method Review, CBM2014-00189, *Hawaiian Telecom, Inc.* v. *Broadband iTV, Inc.*, re U.S. Pat. No. 7,631,336.
Patent Owner's Preliminary Response, Jan. 2, 2015, CBM2014-00189, *Hawaiian Telecom, Inc.* v. *Broadband iTV, Inc.*, re U.S. Pat. No. 7,631,336.
Decision Denying Institution of Inter Partes Review, Jan. 5, 2015, IPR2014-01222, *Unified Patents* v. *Broadband iTV, Inc.*, re U.S. Pat. No. 7,631,336.
Adams, Open Cable Architecture (Cisco Press 2000), Chapter 8-16.
ATSC Standard: Program and System Information Protocol for Terrestrial Broadcast and Cable (PSIP) (Dec. 23, 1997).
Attack of the $500 Killer Network Computers: Time-Warner Cable's Full Service Network, Network Computing (Aug. 19, 2000) Internet Archive, https://web.archive.org/web/20000819050301/http://www.networkcomputing.com/616/616tw.html.
CableLabs Video-On-Demand Asset Distribution Interface Specification, Version 1.1 (Sep. 27, 2002).
CableLabs Video-On-Demand Content Specification Version 1.1 (Jan. 7, 2004).
Declaration of Milton Diaz Perez, *Broadband iTV, Inc.* v. *Hawaiian Telcom, Inc. et al.*, No. 14-cv-00169-ACK-KSC (D. Haw. Mar. 2, 2015).
Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit A, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit B, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit C, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit E, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit F, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit G, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Fickle et al., U.S. Appl. No. 60/429,966, filed Nov. 27, 2002.
Full Service Network and The Orlando Sentinel add interactive dining guide to GOtv, The Free Library, http://www.thefreelibrary.com/Full+Service+Network+and+The+Orlando+Sentinel+add+interactive+dining...-a018299720 published May 20, 1996, last visited Mar. 4, 2015).
Full Service Network(FSN) in Orlando, Florida, Hong Kong University of Science and Technology (May 4, 1997) Internet Archive, https://web.archive.org/web/19970504203603/http://www.ust.hk/~webiway/content/USA/Trial/fsn.html.
Full Service Network, Time Warner Cable, http://m.history.timewarnercable.com/the-twc-story/era-1990-1995/Story.aspx?story=56 (last visited Mar. 4, 2015).
Full Service Network, Wikipedia, http://en.wikipedia.org/w/index.php?title=Full_Service_Network&printable=yes (last visited Mar. 4, 2015).

(56) References Cited

OTHER PUBLICATIONS

Tanenbaum, Computer Networks, 4th ed. (Prentice Hall PTR 2003), pp. 1-14.
Time Warner Cable, DRAFT Asset Distribution System ("Catcher's Mitt") Functional Requirements, Version 1.0 (Jan. 26, 2000).
Time Warner Cable, ISA Data Download Delivery, Version 0.5 (Jun. 3, 2004).
Time Warner Cable, Pegasus Interactive Services Architecture, Version 1.4 (Jun. 5, 2003).
Time Warner Cable, The ISA Tutorial, Version 1.0 (Sep. 13, 2003).
Time Warner Cable's Full Service Network connects live to Innoventions, AllBusiness (published Apr. 10, 1996, archived Mar. 25, 2008) Internet Archive, https://web.archive.org/web/20080325024937/http://www.allbusiness.com/media-telecommunications/telecommunications/7218809-1.html.
Time Warner introduces world's first full service network in Orlando; Network offers First . . . , AllBusiness (published Dec. 14, 1994, archived May 22, 2009) Internet Archive, https://web.archive.org/web/20090522134441/http://www.allbusiness.com/media-telecommunications/telecommunications/7087127-1.html.
Time Warner will close its Full Service Network, Orlando Business Journal, http://www.bizjournals.com/orlando/stories/1997/04/28/daily7.html (last visited Mar. 4, 2015).
Time Warner's 'Time Machine' for Future Video, The New York Times, http://www.nytimes.com/.../12/business/time-warner-s-time-machine-for-future-video.html?pagewanted=2&pagewanted=print (publsihed Dec. 12, 1994, last visited Mar. 4, 2015).
Time Warner Cable, Request for Proposal and Functional Requirements Specification for Video-On-Demand (VOD) Systems, Version 2.0 (Apr. 25, 1997).
Time Warner Cable, Pegasus Movies On Demand Content Specification, Version 1.3 (Sep. 29, 2000).
Time Warner Cable, Pegasus Overall Flow: Movie Delivery, Version 1.0 (Feb. 18, 2004).
PTAB Decision Denying Institution of Covered Business Method Patent Review, Apr. 1, 2015, CBM2014-00189, *Hawaiian Telcom, Inc.* v. *Broadband iTV, Inc.*, re U.S. Pat. No. 7,631,336.
TimeWarner, Time Warner Cable Launches Quick Clips, http://www.timewarner.com/newsroom/press-releases/2006/09/28/time-warner-cable-launches-guick-clips (published Sep. 28, 2006, last visited Jun. 26, 2015).
Time Warner Cable, Photos & Video Go from Digital Cameras to Television with Free, New Time Warner Cable Product, http://www.timewarnercable.com/en/about-us/press/photos_video_go_fromdigitalcamerastotelevisionwithfreenewtimewar.html (published Apr. 27, 2007, last visited Jun. 26, 2015).
Defendants Oceanic Time Warner Cable, LLC and Time Warner Cable Inc.'s Motion for Summary Judgment Regarding Invalidity of U.S. Pat. No. 7,631,336 (ECF 474), *Broadband iTV, Inc.* v. *Hawaiian Telcom, Inc. et al.*, No. 1:14-cv-00169 (D. Haw. Aug. 10, 2015) (5 pgs).
Memorandum in Support of Defendants Oceanic Time Warner Cable LLC and Time Warner Cable Inc.'s Motion for Summary Judgment Regarding Invalidity of U.S. Pat. No. 7,631,336 (ECF 474-1), *Broadband iTV, Inc.* v. *Hawaiian Telcom, Inc. et al.*, No. 1:14-cv-00169 (D. Haw. Aug. 10, 2015) (49 pgs).
Concise Statement of Facts in Support of Defendants Oceanic Time Warner Cable LLC and Time Warner Cable Inc.'s Motion for Summary Judgment Regarding Invalidity of U.S. Pat. No. 7,631,336 (ECF 475), *Broadband iTV, Inc.* v. *Hawaiian Telcom, Inc. et al.*, No. 1:14-cv-00169 (D. Haw. Aug. 10, 2015) (12 pgs).
Declaration of Nathan L. Brown (ECF 475-1), *Broadband iTV, Inc.* v. *Hawaiian Telcom, Inc. et al.*, No. 1:14-w-00169 (D. Haw. Aug. 10, 2015) (6 pgs).
Exhibits 1 (ECF 475-2), 4 (ECF 475-5), 5 (ECF 475-6), and 6 (ECF 475-7) to Concise Statement of Facts in Support of Defendants Oceanic Time Warner Cable LLC and Time Warner Cable Inc.'s Motion for Summary Judgment Regarding Invalidity of U.S. Pat. No. 7,631,336, *Broadband iTV, Inc.* v. *Hawaiian Telcom, Inc. et al.*, No. 1 :14-cv-00169 (D. Haw. Aug. 10, 2015) (133 pgs).
Plaintiff's Opposition to Defendants Time Warner Cable, Inc. and Oceanic Time Warner Cable, LLC's Motion for Summary Judgment Regarding Invalidity of U.S. Pat. No. 7,631,336 (ECF 561), *Broadband iTV, Inc.* v. *Hawaiian Telcom, Inc. et al.*, No. 1:14-cv-00169 (D. Haw. Aug. 27, 2015) (52 pgs).
Plaintiff Broadband iTV, Inc.'s Concise Statement of Facts in Opposition to Defendants Oceanic Time Warner Cable and Time Warner Cable, Inc.'s Concise Statement of Facts (ECF 562), *Broadband iTV, Inc.* v. *Hawaiian Telcom, Inc. et al.*, No. 1:14-cv-00169 (D. Haw. Aug. 27, 2015) (8 pgs).
Declaration of Keith A. Jones (ECF 562-1), Inc.'s Concise Statement of Facts, *Broadband iTV, Inc.* v. *Hawaiian Telcom, Inc. et al.*, No. 1:14-cv-00169 (D. Haw. Aug. 27, 2015) (8 pgs).
Exhibits 1-10 (ECF 562-2-ECF-11), 12 (ECF 562-13), 14 (ECF 562-15), 16-17 (ECF 562-17-562-18), and 19-20 (ECF 562-20-562-21) to Plaintiff Broadband iTV, Inc.'s Concise Statement of Facts in Opposition to Defendants Oceanic Time Warner Cable and Time Warner Cable, Inc.'s Concise Statement of Facts, *Broadband iTV, Inc.* v. *Hawaiian Telcom, Inc. et al.*, No. 1:14-cv-00169 (D. Haw. Aug. 27, 2015) (508 pgs).
Order Granting in Part and Denying in Part Defendants Oceanic Time Warner Calbe, LLC and Time Warner Cable, Inc.'s Motion for Summary Judgment Regarding Invalidity of U.S. Pat. No. 7,631,336, *Broadband iTV, Inc.* v. *Oceanic Time Warner Cable, LLC and Time Warner Cable, Inc.*, No. 15-00131 (D. Haw. Sep. 29, 2015) (77 pgs).
Judgment, *Broadband iTV, Inc.* v. *Oceanic Time Warner Cable, LLC and Time Warner Cable, Inc.*, No. 15-00131 (D. Haw. Sep. 29, 2015) (2 pgs).
Plaintiff's Notice of Appeal; Certificate of Service, *Broadband iTV, Inc.* v. *Oceanic Time Warner Cable, LLC and Time Warner Cable, Inc.*, No. 15-00131 (D. Haw. Oct. 9, 2015) (4 pgs).
Order Granting Defendant Hawaiian Telcom, Inc.'s Motion for Summary Judgment of Invalidity Under 35 U.S.C. § 101, *Broadband iTV, Inc.* v. *Hawaiian Telcom, Inc.*, No. 14-00169 (D. Haw. Sep. 29, 2015) (43 pgs).
Judgment, *Broadband iTV, Inc.* v. *Hawaiian Telcom, Inc.*, No. 14-00169 (D. Haw. Sep. 29, 2015) (2 pgs).
Plaintiff's Notice of Appeal; Certificate of Service, *Broadband iTV, Inc.* v. *Hawaiian Telcom, Inc.*, No. 14-00169 (D. Haw. Oct. 9, 2015) (4 pgs).
Brief of Amid Curiae Broadband iTV, Inc., Double Rock Corporation, Island Intellectual Property, LLC, Access Control Advantage, Inc., and Fairway Financial U.S., Inc. In Support of Appellants, *Netflix, Inc.* v. *Rovi Corporation et al.*, No. 2015-1917 (Fed. Cir. Dec. 18, 2015).
Consolidated Brief for Appellant Broadband iTV, Inc., *Broadband iTV, Inc.* v. *Hawaiian Telcom, Inc. et al.*, No. 16-1082 (Fed. Cir. Jan. 21, 2016).
Amicus Brief of United Inventors Association of the United States of America in Support of Appellant Broadband iTV, Inc. and Reversal, *Broadband iTV, Inc.* v. *Hawaiian Telcom, Inc. et al.*, No. 16-1082 (Fed. Cir. Jan. 27, 2016).
Amicus Brief by Tranxition, Inc., *Broadband iTV, Inc.* v. *Hawaiian Telcom, Inc. et al.*, No. 16-1082 (Fed. Cir. Jan. 28, 2016).
VDO expands Webcasting possibilities, Broadcasting & Cable, Nov. 11, 1996 (3 pgs).
Jose Alvear, "Web Developer.com Guide to Streaming Multimedia", Chapters 9 and 11, 1998 (46 pgs).
Business Wire, "Ivex Announces ViewOps Internet Video Service; Allows Business Managers to View and Manage Operations Online," May 2, 2000 (2 pgs).
EPO Communication for European Application No. 08726793.6, dated May 30, 2016.
EPO Communication for European Application No. 08768802.4, dated May 30, 2016.

* cited by examiner

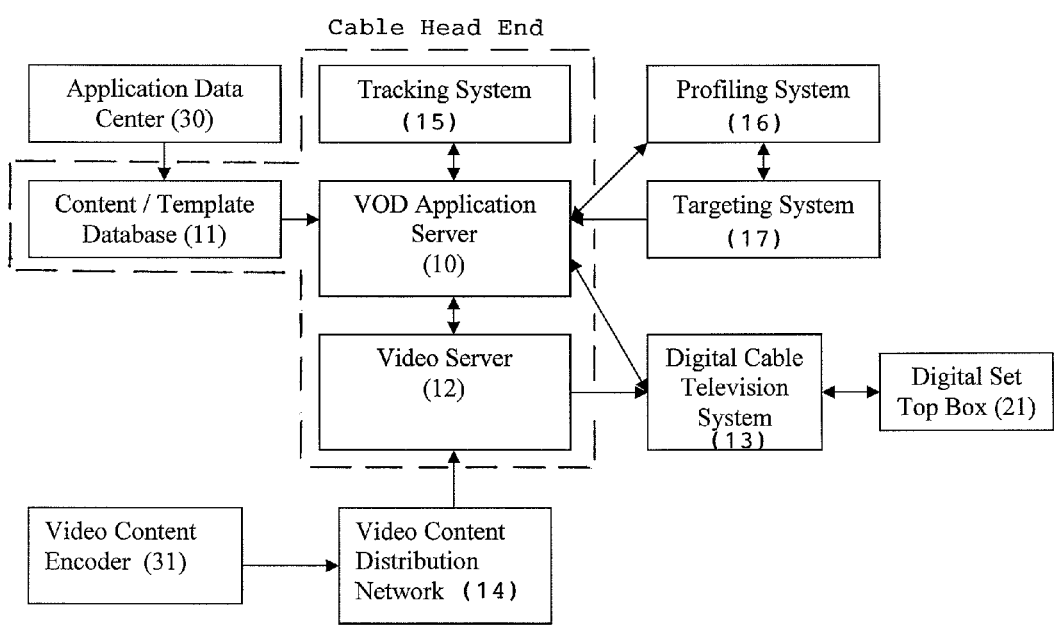
Figure 1A: VOD Content Delivery System, Overall Architecture

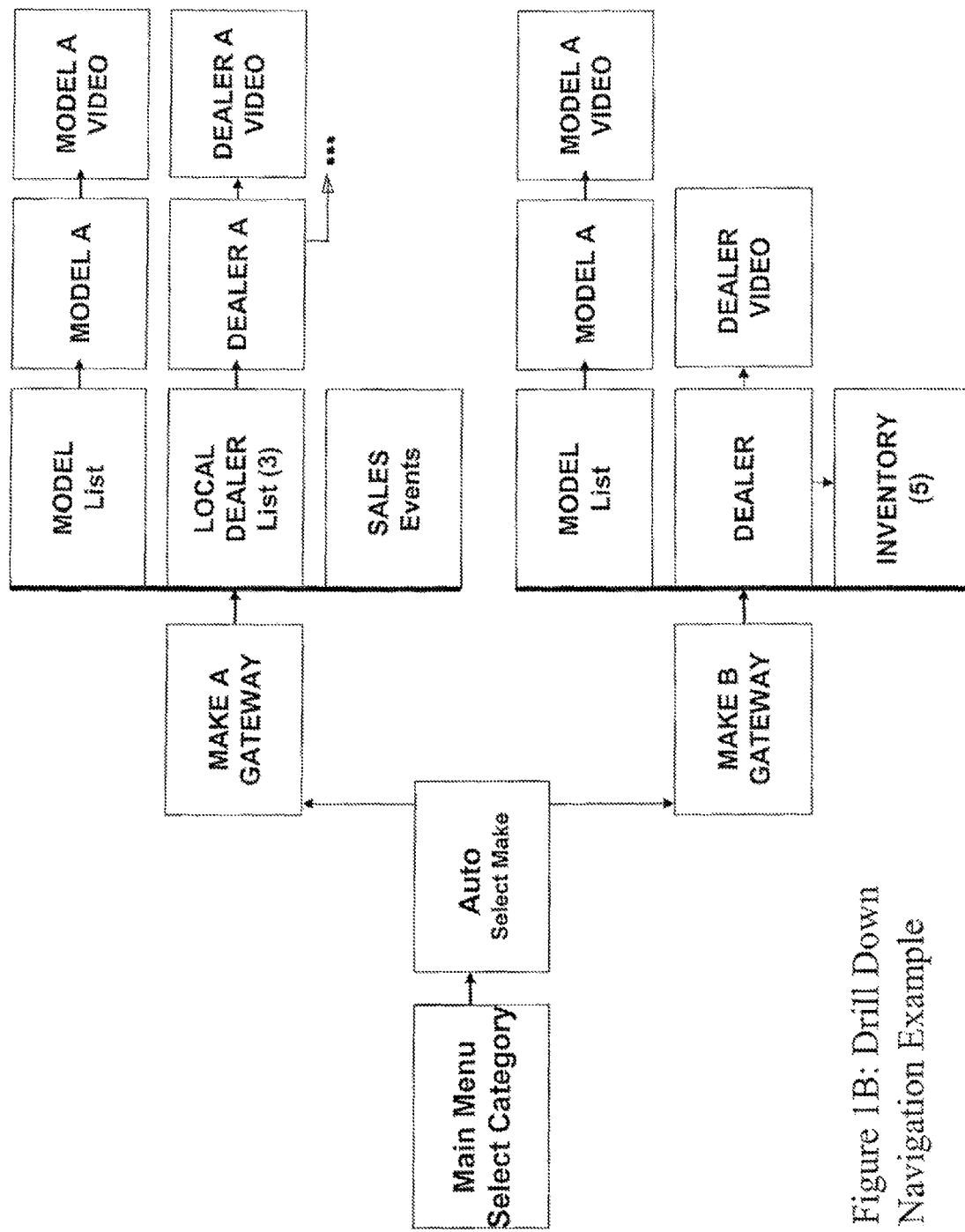
Figure 1B: Drill Down Navigation Example

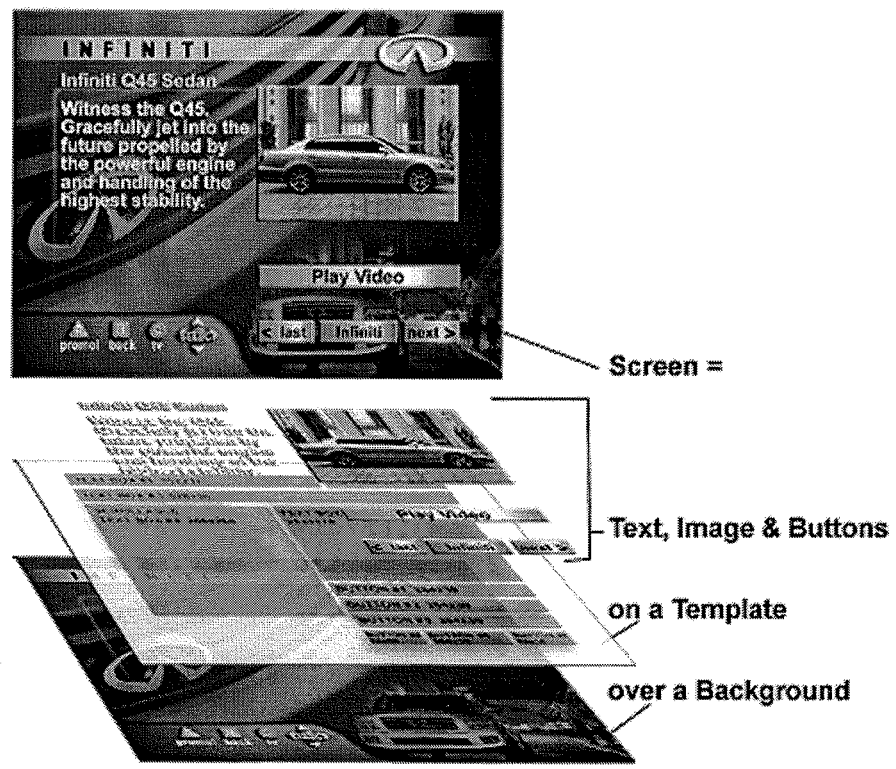
Figure 1C: Template Layer Model

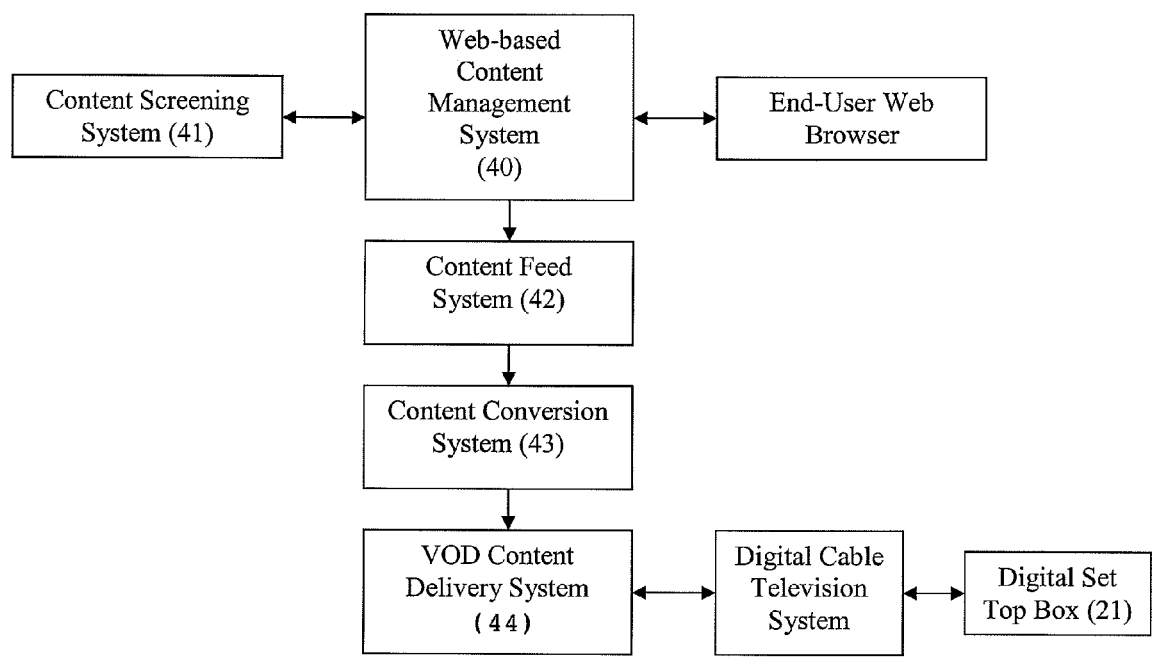
Figure 2A: Classified Ad System, Overall Architecture

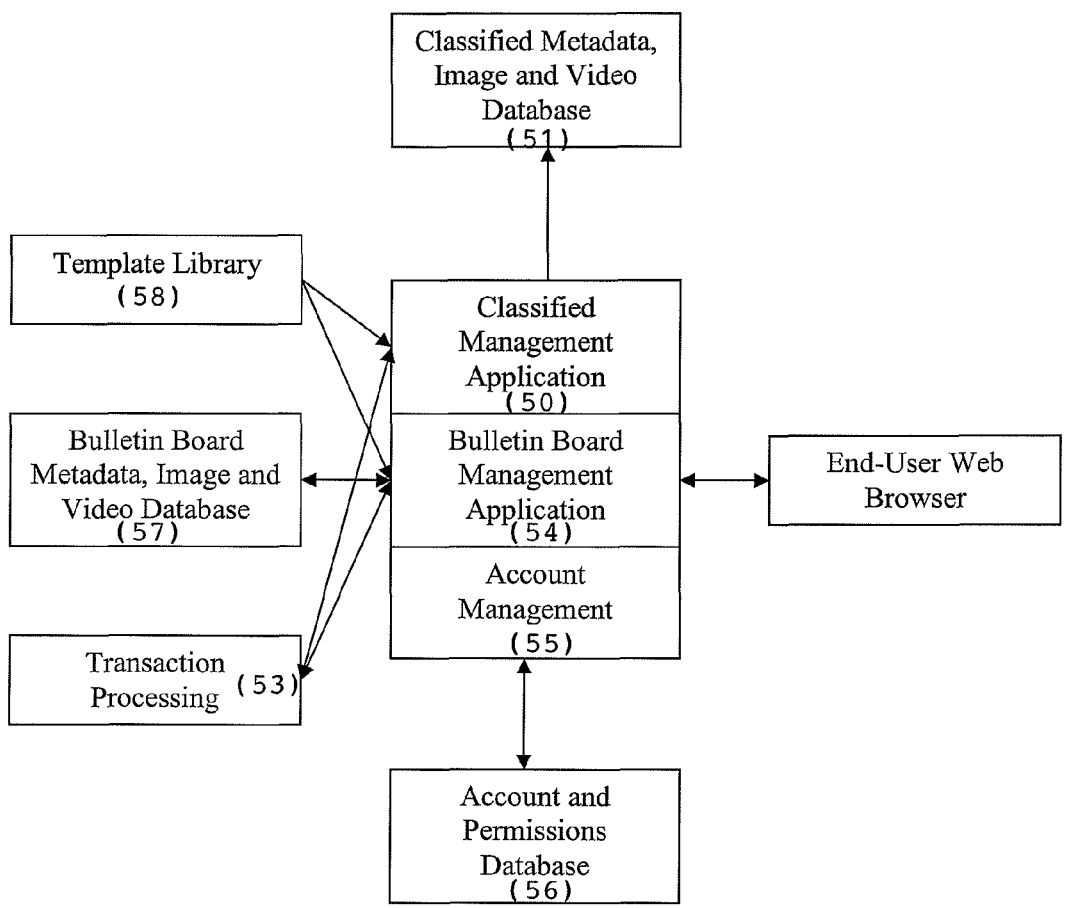
Figure 2B: Web-based Content Management System

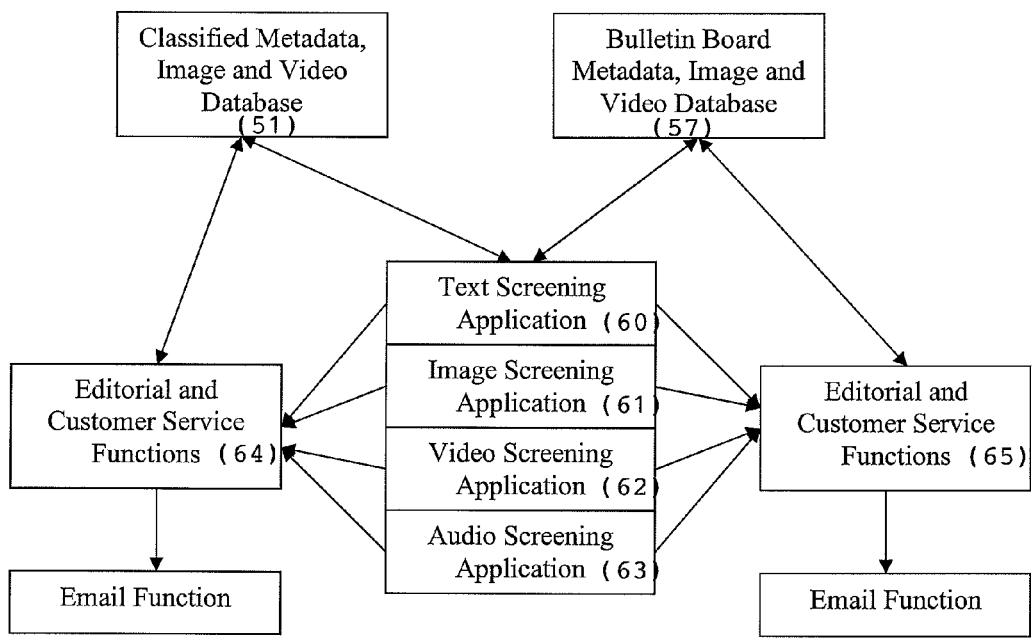
Figure 2C: Content Screening System

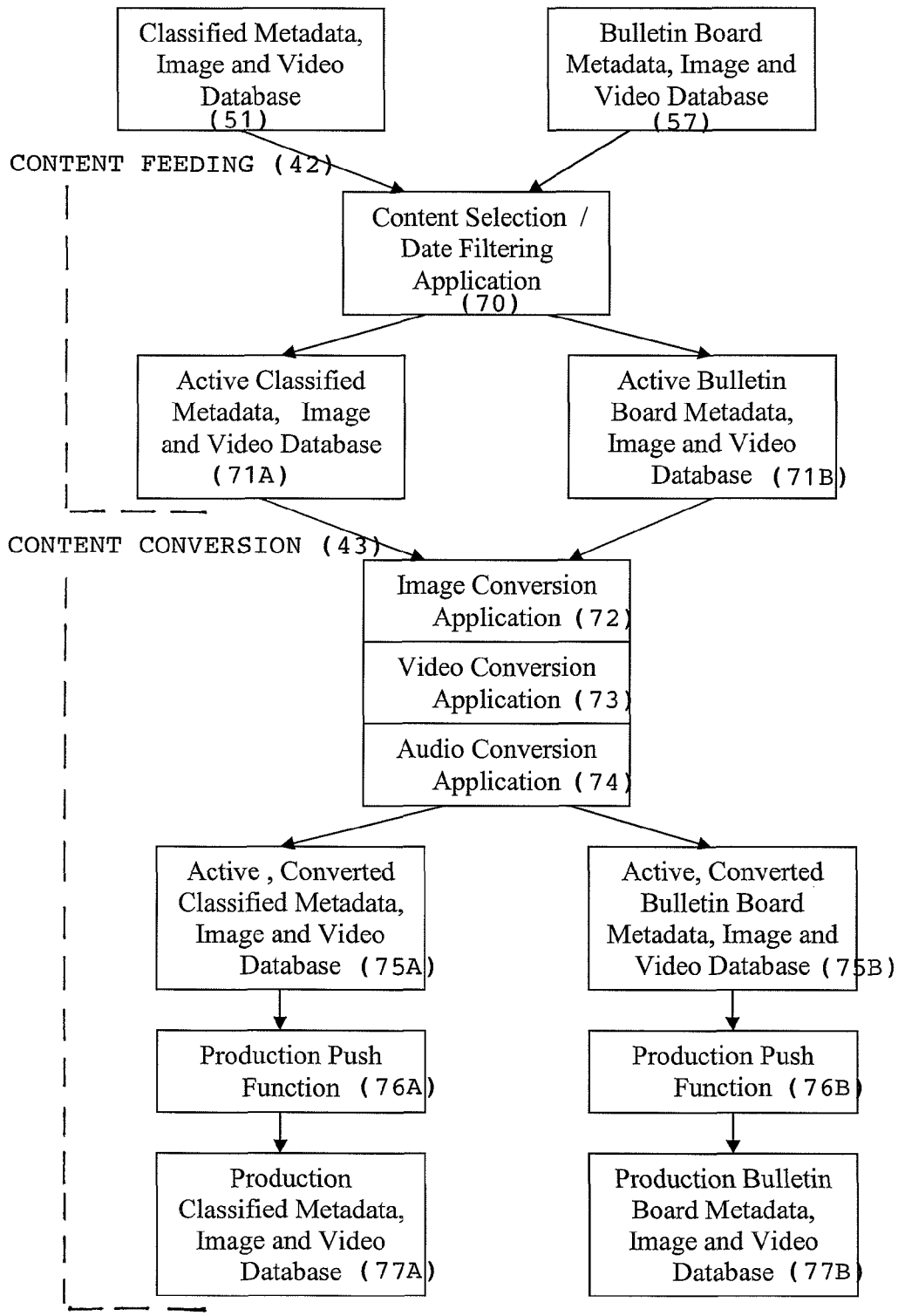
Figure 2D: Content Feed and Conversion System

VIDEO-ON-DEMAND CONTENT DELIVERY METHOD FOR PROVIDING VIDEO-ON-DEMAND SERVICES TO TV SERVICE SUBSCRIBERS

CROSS-REFERENCE TO RELATED APPLICATIONS

This U.S. Patent Application is a continuation application and claims the benefit of copending U.S. patent application Ser. No. 14/706,721, filed on May 7, 2015, of the same inventor, which was a continuation application of U.S. patent application Ser. No. 12/852,663, filed on Aug. 9, 2010, of the same inventor, issued as U.S. Pat. No. 9,078, 016 on Jul. 7, 2015, which was a divisional application of U.S. patent application Ser. No. 11/952,552, filed on Dec. 7, 2007, of the same inventor, issued as U.S. Pat. No. 7,774, 819 on Aug. 10, 2010, which was a divisional application of U.S. patent application Ser. No. 10/909,192, filed on Jul. 30, 2004, of the same inventor, issued as U.S. Pat. No. 7,590, 997 on Sep. 15, 2009, each of which is hereby incorporated by reference as if fully set forth herein.

TECHNICAL FIELD

This invention generally relates to the provision of interactive television services through cable TV infrastructure, and more particularly, to a system and method for managing, converting and displaying video content on a video-on-demand platform, and particularly, advertising displays used for drill-down navigation and displays of consumer-generated classified ads on TV.

BACKGROUND OF INVENTION

Cable television (CATV) systems are used to deliver television services to a vast majority of TV-viewing homes in the U.S. and other technologically advanced countries. The typical CATV system has a cable service provider head end equipped with video servers to transmit CATV program signals through distribution lines to local nodes and from there to TV subscriber homes. Within the subscriber homes, the CATV program signals are transmitted to one or more customer-premises TVs which are coupled to external set-top boxes for channel tuning or are equipped with internal cable channel tuners.

Current CATV set-top boxes provide various functions for channel switching and program access between subscribers and the CATV head end. The more advanced digital set-top boxes are individually addressable from the CATV head end, and also allow subscribers to input via remote control units their selection inputs for transmission on a back channel of the connecting cable to the CATV head end, thereby enabling subscribers to access interactive television services and other types of advanced digital TV services. A primary type of interactive television system is referred to generally as a "video-on-demand" (VOD) system, wherein a viewer can enter a selection choice for a video program via the remote control unit to the set-top box and have the desired video program delivered instantaneously for display on the TV. Such VOD applications can include on-demand movies, documentaries, historic sports events. TV programs, infomercials, advertisements, music videos, short-subjects, and even individual screen displays of information. VOD-based interactive television services generally allow a viewer to use the remote control to cursor through an on-screen menu and select from a variety of titles for stored video programs for individual viewing on demand. Advanced remote control units include button controls with VCR-like functions that enable the viewer to start, stop, pause, rewind, or replay a selected video program or segment. In the future, VOD-based interactive television services may be integrated with or delivered with other advanced interactive television services, such as webpage browsing, e-mail, television purchase ("t-commerce") transactions, and multimedia delivery.

With the increasing interactive functionality and customer reach of interactive television services, advertisers and content providers are find it increasingly attractive to employ on-demand advertising, program content, and TV transactions for home viewers. VOD content delivery platforms are being designed to seamlessly and conveniently deliver a wide range of types of advertising, content, and transaction services on demand to home viewers. An example of an advanced VOD delivery platform is the N-Band™ system offered by Navic Systems, Inc., d/b/a Navic Networks, of Needham, Mass. This is an integrated system which provides an application development platform for third party application developers to develop new VOD service applications, viewer interfaces, and ancillary interactive services for deployment on VOD channels of CATV operators in cable service areas throughout the U.S. A detailed description of the Navic N-Band system is contained in U.S. Patent Application 2002/066,106, filed on May 30, 2002, which is incorporated herein by reference.

Advanced digital set-top boxes also have the ability to collect data such as a log of channels tuned to and programs watched by the viewer. The set top box can be designed to collect and report this data automatically to the cable head end. At the head end location, the viewer data can be aggregated over many users with personally identifying data removed, and provided to advertisers and program sponsors for information in designing and targeting new ads and programs for viewer preferences, thereby resulting in increased viewership, higher viewer impressions per ad or program, and ultimately increased revenues.

Current VOD ads and program offerings are generally produced for mass audiences. It would be particularly desirable to adapt a VOD delivery platform to deliver ads, promotions, programs, and informational content by allowing viewers to navigate readily and visually to specific items of interest. Such visual navigation for content delivery would be more likely to create a satisfying viewer experience, and also to engage individual viewers in on-demand TV services and transactions. It would also be a particularly desirable to adapt a VOD delivery platform to receive uploads of user ads from individuals such as through an online network for search, navigation, and display to TV subscribers.

SUMMARY OF THE INVENTION

In accordance with a first objective of the present invention, a video-on-demand (VOD) content delivery system for delivery templatized VOD content comprises:

(a) a VOD Application Server located at a Cable Head End which manages a Database of templates for generating templatized VOD content in response to requests for specific video content elements by viewer request signals transmitted from the TV equipment of a viewer to the Cable Head End;

(b) a Video Server for storing video content encoded as video content elements and for supplying a requested video content element in response to the VOD Application Server for delivery to the TV equipment of the viewer; and (c) an Application Data Center for creating and storing a plurality of different templates ordered in a hierarchy for presentation of video content elements of different selected types categorized in hierarchical order, wherein a template for display of a video content element in a higher level of the hierarchy includes a link to one or more templates and video content elements in a lower level of the hierarchy, said plurality of hierarchically-ordered templates and links being stored in the Database managed by the VOD Application Server, and wherein said VOD Application Server, in response to viewer request for a selected video content element of a higher order in the hierarchy, retrieves the corresponding template from said Database and corresponding video content element from said Video Server to provide a templatized VOD content display on the viewer's TV equipment which includes one or more links to video content elements in a lower order of hierarchy, and upon viewer request selecting a link displayed in the templatized VOD content to a video content element in the lower order of hierarchy, retrieves the corresponding template and video content element of lower order hierarchy for display on the viewer's TV equipment, thereby enabling the viewer to use drill-down navigation through TV displays of templatized VOD content.

In a preferred embodiment of the templatized VOD content delivery system, the system employs the templatized content delivery to create a User Interface for the viewer to navigate through progressively more specific template (display ad) types linked in series to reach an end subject of interest to the viewer. Referred to herein as "Drill-Down Ads", the series of progressively more specific display ad types allow the subscriber to navigate to an end subject of interest while at the same time having a unique visual experience of moving visually through a series of ads mirroring the viewer's path to the end subject of interest.

As an example involving automobile advertising, the User Interface can provide a hierarchical ordering of video display ads that starts with an Auto Maker's ad displayed with links to Model ads. The viewer can select using the remote control unit a specific Model ad which is displayed with links to more specific levels of ads, such as "Custom Packages", "Feature/Options", or "Color/Styling", etc., until it reaches an end subject of interest to the subscriber. The viewer would thus be able to navigate to specific content of interest while traversing through video ad displays of the Auto Maker, Models, Model A, Features, etc. Similarly, the viewer can navigate to specific content of interest while traversing through video ad displays of Local Dealers, Dealer A, Current Sales Promotions, etc. The templatized VOD ads are generated dynamically by searching the VOD Application database with each current request by a viewer. This enables the system to dynamically generate and display updated advertising content that remains current. For example, if the Auto Maker changes the Model types available, or if Local Dealer A changes its current sales promotions, that advertiser's ads can be updated with new content and selection options on the system database, and the new templatized ads can be generated dynamically, instead of new ads having to be filmed, produced, contracted, and installed with the cable TV company. Many other types of ads, subjects, and other interactive TV applications can be enabled with the use of the Drill-Down Navigation method. The selections or preferences exhibited by viewer navigation paths through the Drill-Down Navigation can also be tracked, profiled, and/or targeted as feedback data to advertisers for fine-tuning Drill-Down ad designs.

In accordance with a second objective of the invention, a video-on-demand (VOD) content delivery system for managing, converting and displaying consumer-generated classified ads on TV comprises:

(a) a Content Management Website for enabling individual users to upload classified ad content on an online network connection from their remote computers, said uploaded classified ad content including associated meta data for identifying the ad content by title and topical area;

(b) a Content Screening Component for receiving the classified ad content uploaded to the Content Management Website and screening the content for objectionable text, audio, video and/or images in the content, and for rejecting said content if objectionable text, audio, video and/or images are found;

(c) a Content Feed Component for automatically transferring the classified ad content screened by the Content Screening Component with the associated meta data and supplying them to a Content Conversion Component;

(d) a Content Conversion Component for automatically converting the transferred classified ad content supplied from the Content Feed Component into a video data format compatible with the VOD content delivery system, and for automatically indexing the converted classified ad content in a Video Server database according to title and topical area as specified in the content meta data; and (e) a VOD Application Server, operatively connected between said Content Conversion Component and a Cable Head End connected via cable connection to the TV equipment of viewers, for delivering from the Cable Head End classified ad title and topical area listings data generated from the meta data for the classified ad content to be displayed on the TV equipment of viewers to enable their searching for classified ads of interest and, in response to a viewer request signal requesting a specific classified ad of interest transmitted via the TV equipment to the Cable Head End, for retrieving the requested classified ad from the Video Server database and transmitting it to be displayed to the viewer on their TV equipment.

In a preferred embodiment of the TV classified ads system, individual users can upload classified ad content via their web browser, including text, audio, video and/or image files in industry-standard file formats, to the Content Management Website. The Content Screening Component is configured to parse the input for objectionable text words in text files, detect objectionable audio words in audio files, and optically recognize objectionable images in graphics or video files. The Content Feed Component automatically transmits classified ad content that has been appropriately contracted for display (paid for, and within the contracted time period) to the Content Conversion Component and the Video Server database. The VOD Application Server responds to requests input by viewers via remote control and retrieves the requested classified ads indexed by their titles and topical areas from the Video Server database to be displayed on the viewer's TV. The Content Management Website can also include functions for: (a) Account Management of user transaction accounts; (b) Content Classification to facilitate user designation of titles and topical areas to uniquely and attractively identify their classified ads; (c) Bulletin Board for creation and management of consumer-generated content related to announcements and other items of general interest to be displayed to viewers in subsidiary displays; and (d) Transaction Processing for the processing the payment of user fees, changes, and refunds in the use of the system.

The foregoing and other objects, features and advantages of the invention are described in further detail below in conjunction with the accompanying drawings.

BRIEF DESCRIPTION OF THE DRAWINGS

FIG. 1A is a diagram of an overall architecture for a VOD Content Delivery System in accordance with the present invention, FIG. 1B shows an example of Drill-Down Ad navigation, and FIG. 1C shows an example of the templatized ad display model.

FIG. 2A is a process flow diagram of the overall architecture of a consumer-generated Classified Ad application for the VOD Content Delivery System, FIG. 2B illustrates a Content Management Website for the Classified Ad application, FIG. 2C illustrates a Content Screening Component of the system, and FIG. 2D illustrates a Content Feed and Conversion Components of the system.

DETAILED DESCRIPTION OF INVENTION

Referring to FIG. 1A, an overall system architecture for a VOD content delivery system includes a VOD Application Server 10 located at a Cable Head End. The VOD Application Server 10 manages a Database 11 of templates and video content segments from Video Server 12 for generating templatized VOD content. The VOD content is generated in response to a viewer request signal transmitted from the Digital Set Top Box 21 of a viewer's TV equipment through the Digital Cable Television System 13 to the VOD Application Server 10 at the Cable Head End. The VOD Application Server 10 may be of the type which enables any compatibly-developed VOD applications to be loaded on and operated on the server. An example of such a VOD Application Server is the Navic N-Band™ server as previously described. Templates for displaying VOD content are created at an Application Data Center 30 and stored in the Database 11 for use by the operative VOD application. The templates may be designed, for example, to present video ad content displays in a logo frame, or to provide navigation buttons and viewer selection options in a frame around currently displayed video content. In the preferred embodiment described in greater detail below, the templates are used to provide navigation aids in a series of progressively more focused ad display types. A Video Content Encoder 31 is used to encode raw video feeds into formatted video content segments compatible with the VOD platform and supply them through a Video Content Distribution Network 14 to the Video Server 12.

In operation, the VOD Application Server 10 operates a VOD application for the CATV system, for example, "automobile infomercials on demand". The viewer sends a request for selected VOD content, such as to see an infomercial on a specific model type made by a specific auto manufacturer, by actuating a viewer request signal by a key press on the viewer's remote control unit transmitting an IR signal to the Set Top Box 21 that is sent on a back channel of the Digital Cable Television System 13 to the VOD Application Server 10 at the Cable Head End. In response to the signal, the VOD Application Server 10 determines the VOD content being requested and retrieves the infomercial ad display template from the Template Database 11 and video content segment from the Video Server 12, in order to generate the corresponding templatized VOD content. In the invention, the templates are of different types ordered in a hierarchy, and display of content in a template of a higher order includes links the viewer can select to content of a lower order in the hierarchy. Upon selecting a link using the remote control, the VOD Application Server 10 retrieves the template and video content of lower order and displays it to the viewer. Each successive templatized display may have further links to successively lower levels of content in the hierarchy, such that the viewer can use the series of linked templatized VOD displays as a "drill-down navigation" method to find specific end content of interest.

Referring to FIG. 1B, a preferred embodiment of the templatized VOID content delivery system is shown providing a User Interface using Drill-Down Navigation through display ads, such as for automobile infomercials. When the viewer selects a VOD application (channel), such as "Wheels-On-Demand", the viewer's TV displays a Main Menu with buttons inviting the viewer to "Select Category". The viewer can select an "Auto" category, and the TV then displays an "Auto" menu with buttons inviting the viewer to "Select Make", such as Make A, Make B, etc. When the viewer makes a selection, such as Make A, the viewer's TV displays a further menu that is a Gateway into templatized VOD content delivery which enables Drill-Down Navigation by templatized display ads. Through the Gateway, the VOD Application leaves the Menu mode and enters the Drill Down Navigation mode for successively displays of hierarchically-ordered video content which allow the viewer to navigate to progressively more focused content. In this example, the highest level of the hierarchy includes categories for Model, Local Dealer, Sales Events, and/or Inventory. When the viewer selects a category such as "Model" from the Gateway, for example, the VOD Application creates a templatized ad display showing video content generic to all models by that automaker framed in a frame which has links (buttons or choices) for a list of the specific models made by that automaker. When the viewer selects the link to a specific model, "Model A" for example, the VOD Application creates a templatized ad display showing video content for Model A, and the viewer can then choose to run a long-form infomercial of the Model A video. Alternatively, the Drill-Down Navigation can continue with further levels of specificity, such as "Custom Packages", "Options", "Colors/Stylings", etc. Similarly, the selection of the "Local Dealer" category from the Gateway can bring up a templatized ad for local dealers with links to specific local dealers in the viewer's cable service area, and a click on a specific "Dealer A" can bring up a templatized ad for Dealer A with further links to more specific content pertaining to Dealer A, such as "Current Sales Promotions", etc.

In this manner, the templatized VOD content delivery system allows the viewer to navigate to specific content of high interest to the viewer using the Drill-Down ads as a navigation tool, while at the same time having a unique visual experience of moving through a series of ads mirroring the viewer's path to the subject of interest. The templatized VOD ads are generated dynamically by searching the Content/Template database with each request by a viewer, enabling the system to display updated navigation choices and content simply by updating the database with updated links and video content. For example, if the Auto Maker changes the Model types of autos currently available, or if Local Dealer A changes its current sales promotions for autos currently available, that advertiser's ads can be updated with new template frame navigation links and content, instead of entirely new ads or screen displays having to be shot, produced, contracted, delivered, and programmed with the cable TV company. Many other types of layered or indepth ads, subjects, and interactive TV applications can be enabled with the use of the Drill-Down Navigation method. The selections or preferences exhibited by viewer navigation paths through the Drill-Down Navigation can also be tracked, profiled, and/or targeted as feedback data to advertisers for fine-tuning Drill-Down Navigation designs.

In FIG. 1C, an example illustrates how a templatized VOD display is generated in layers. A Background screen provides a basic color, logo, or graphical theme to the display. A selected Template (display frame) appropriate to the navigation level the intended display resides on is layered on the Background. The Template typically has a frame in which defined areas are reserved for text, display image(s), and navigation links (buttons). Finally, the desired content constituted by associated Text, Image & Buttons is retrieved from the database and layered on the Template. The resulting screen display shows the combined background logo or theme, navigation frame, and text, video images, and buttons Referring again to FIG. 1A, a Tracking System 15 of conventional type can be installed at the Cable Head End to aggregate non-personal data on what channels and programs viewers watch. For the Drill Down Navigation method, the Tracking System 15 can include tracking of the navigation paths viewers use to find subjects of interest in a VOD Application. The aggregation of viewer navigation data can indicate what subjects are most popular, whether some subjects are of greater interest to viewers at certain times of day, of certain demographics, or in relation to certain products or services. The VOD Application Server 10 can export the aggregated viewer navigation data to an external Profiling System 16, such as a non-biased or unrelated firm applying profile analysis methods. The results of the Profiling System 16 can be communicated to a Targeting System 17, such as a template design firm or content production company, to fine-tune the presentation of the templatized VOD content consistent with viewer preferences or interests. The feedback from the Targeting System can be supplied as feedback to the VOD Application Server to modify the Content/Template Database 11.

Another application for the templatized VOD content delivery system can be developed to support video advertisements which link national to local market ad campaigns in "drill-down" fashion. Advertisers, both national and local, can pay for placement of their video advertisements on the system. When the VOD Application is run, the national ads are displayed as a Gateway to linking to the local market ads. In this manner, national ads can be used to transition viewers from general interest in a product to finding specific information about the product available locally.

The templatized VOD content delivery system can also support "traffic building" videos, including music videos, that may not generate direct revenue. Once a video is encoded and registered into the system, the management and distribution of the video is conducted through software systems and automated controls. The User Interface provides the user with the ability to navigate and find desired video content. Selection of a category presents the user with a list of video titles available for playback. Categories and title lists can be generated using real-time database queries, allowing for database-driven management of content within the User Interface. The User Interface can also support a search interface which allows the user to search the video content database to generate a list of video titles with specific characteristics.

The core services and functions of the VOID content delivery system can include:

Encoding—converts videos to proper digital format for playback on cable video-on-demand systems, currently MPEG2 format Metadata Input—allows for the input of descriptive data regarding each video Packaging—Prepares a data package for transport consisting of the encoded video file and the metadata Scheduling—Establishes the schedule when packages are to be delivered to cable video-on-demand systems via the transport system Transport—Digital broadcast medium through which the packages are migrated from the central processing facility to the cable video-on-demand systems The core services and functions of the User Interface system can include:

Development of UI "pages"—An Internet-based system is used for the composition, coding and quality assurance of the User Interface images ("pages") that are presented to the user on an interactive basis.

Category and List Presentation—The category lists and title lists presented to the user for navigation and selection can be generated and rendered real-time using database queries against the video metadata database. These lists can also be incorporated in the fully rendered graphics if real-time queries are not required or desired.

Distribution—The UI system supports a scheduling and transport subsystem separate from the video distribution system for the distribution of the UI assets and related set-top box software components to local UI servers installed at the cable head end.

User Input Device—The UI system receives user input and commands from the IR remote control used with the digital set-top box.

User Database—The UI system maintains a database of set-top box addresses that is used to identify the users of the system. This database is the seed for the Profiling Database system described below.

Targeting—The UI system is capable of changing the UI presentation to a specific user based on the information contained in the User Database and the Profiling Database.

The core services and functions of the Tracking System can include:

Consolidation of Video-On-Demand Data—The Tracking System can be made capable of ingesting and consolidating usage data provided by the cable video-on-demand systems. This may be performed through automated interfaces or "feeds", or it may be performed through the batch processing of data files delivered by the cable operators.

Consolidation of UI Data—The Tracking System can gather and consolidate data from the UI system on an automated basis. The UI system can provide data describing the user commands, behaviors, responses and requests generated by each user while using the User Interface system.

Reporting—The Tracking System can generate reports and analyses of the Video-On-Demand data and the UI data.

Web Interface—The Tracking System can include a Web interface for providing authorized users such as advertisers with access to specific reports.

The core services and functions of the Profiling System can include:

Consolidation of Profiling Data—The Profiling System can be made capable of consolidating on a continuing, automated basis all user-related data requested by advertisers or by the system operator.

Interface to Targeting System—The Profiling System can provide pertinent data as required by the Targeting System within the UI system. This data is used to reformat UI presentations based on the data values.

Interface to Targeting System—The Profiling System data can be accessed and incorporated into the Targeting System. Support of Private and Public Data—The Profiling System can segregate and maintain as private any data gathered specifically for an advertiser for the use of that advertiser.

As another aspect of the present invention, a VOD content delivery system may be adapted to offer consumer-generated classified ads on TV. The VOD content delivery system is provided with a Content Management frontend to receive consumer input and convert it to video display ads maintained in the system database. Referring to FIG. 2A, a system for managing, converting and displaying individual consumer-generated ads on a VOD content delivery system has a Web-based Content Management System 40 for enabling an individual user to upload content from their computer via a web browser to display a consumer-generated video ad on TV. The uploaded content includes meta data for classifying the video ad by title and topical area(s). A Content Screening System 41 is used for screening the content input by the individual user, such as by performing automatic searching for objectionable text, audio, video and/or images and rejecting the content if found objectionable. A Content Feed System 42 is used to automatically transfer consumer-generated content screened through the Content Screening System 41 to a Content Conversion System 43. This system automatically converts the consumer-generated content supplied by the Content Feed System 42 into video display format compatible with the VOD content delivery system. The converted video ad is indexed by title and classified topical areas according to the meta data supplied by the user, in accordance with the indexing system maintained by the Content Management System. The VOD Content Delivery System 44 operates a Classified Ads VOD Application in which menus for finding classified ads are navigated by viewers, and specific classified ads are delivered through the Digital Cable Television System for display as video ads on the viewer's TV equipment in response to viewer request input by remote control to the Digital Set Top Box 21, as described previously with respect to the operation of the general VOD platform.

Referring to FIG. 2B, the Web-based Content Management System 40 includes a plurality of functional components to allow consumers to create and manage their own classified ads as interactive television content, as well as pay for the distribution of their content within the digital cable television system. A Classified Management Application 50 is used to receive consumer-input content, have it screened (by the Content Screening System 41, not shown), and store it in the Classified Metadata, image and Video Database 51. Consumer payment for running video ads is handled by the Transaction Processing Component 53. Also included in the Content Management System is an Account Management Component 55 and Account & Permissions Database 56 for management of user accounts for use of the web-based TV Classified Ads system. A Bulletin Board Ads application may be operated in parallel with the TV Classified Ads application. A Bulletin Board Management Application 54 and Database 57 enable the creation and management of consumer-generated content relating to public announcements and other items of general interest for groups, organizations or topics. The preferred VOD Content Delivery System uses templatized VOD content, and a Template Library 58 is used to store templates for both the Classified Ads and Bulletin Board Ads applications.

The Account Management Component controls the access by persons to the web-based Content Management System. The Account Management Component identifies persons accessing the system for the first time and allows these persons to register and create an account by providing an account name, password, credit card information and other information required for the payment of fees. The Account Management Component controls the access by registered users to their accounts and manages the privileges and security associated to all accounts. Persons may create accounts for the creation and management of Classified Ads. Accounts capable of accessing the Bulletin Board Management Application may also be assigned by a system administrator in the Account Management Component. Any account capable of accessing the Bulletin Board application can then create and manage bulletin board ads for the assigned bulletin boards.

The Classified Content Management System enables users to upload text, audio, video, and/or image files for classified ads in industry-standard file formats and have it converted into video display ads compatible with the VOD Content Delivery System. Classified ads are searched on the viewer's TV equipment by menus and lists indexed by title and topical areas corresponding to the metadata associated with the classified ads content. Selection of a listed item results in the display of a TV display ad containing uploaded text, images, video and/or audio. Users pay listing fees to the operator of the system for maintaining and displaying the classified ads on the digital cable television system.

Significant features of the Classified Ads Content Management System include: (a) the ability to enter descriptive data and text regarding the item; (b) uploading digital images of the item to the Content Management System; (c) uploading digital video of the item to the Content Management System; (d) uploading digital audio regarding the item to the Content Management System; (e) automated size and resolution processing of digital images uploaded to the system; (f) automated digital format conversion of digital video uploaded to the system; (g) automated digital format conversion of digital audio uploaded to the system; (h) ability for users to select an interactive television screen design (template) from a catalog of available templates; (i) ability to view on a web browser the interactive television template containing the consumer-provided content; (j) ability to save classified content in persistent memory or storage liar subsequent modification; (k) ability to mark classified content as completed and ready for submission to, the interactive television system; (l) ability to specify the date and time when a classified content item is to become accessible by users of the interactive television system and the data and time when a classified content item is to be removed from display on the interactive television system; (m) ability to notify the user through email or other communication system that a specific content item is scheduled to be displayed or removed from the interactive television system; (n) ability to modify and resubmit previously created classified content for display on the interactive television system; (o) ability to access viewing data generated by the Tracking System regarding access and use of specific consumer-generated content by users of the interactive television system; and (p) ability to calculate fees for classified content and submit payment of the fees using the Transaction Processing system.

As noted in (i) above, the Classified Content Management System allows the user to view the content they have composed using the templates. The templates are designed specifically for use on interactive television systems and the user is able to view on the web-interface their content as composed for presentation on television. As noted in (j) above, the Classified Content Management System allows the persistent storage of classified content; although the user is composing interactive television pages using a template system, the content is persistently stored as individual elements to simplify changes by the user and to allow the conversion of the content to different formats as required by different interactive television systems.

The Bulletin Board Content Management System provides the users of the web-based Content Management System with content creation and content management tools for the creation and maintenance of consumer-generated content related to announcements and other informational items of general interest. Bulletin Board content is displayed on the interactive television system as dedicated interactive television screens (bulletin hoards), where approved groups, organizations or topics are each assigned a bulletin board for the display of their information. Bulletin Board content is displayed as list items organized within a bulletin board; selection of a list item results in the display of an interactive television screen containing or providing access to the descriptive data text, images, video and audio regarding the item.

An alternative implementation of a Bulletin Board can display the content as scrolling text, where the user scrolls through the text, or the text scrolls automatically. Bulletin Board accounts will pay fees determined by the operator of the system for the distribution of the bulletin board content on the interactive television system for display on the digital cable television system. Significant features of the Bulletin Board Content Management System include: (a) the ability to enter descriptive data and text regarding the item; (b) upload digital images to the content management; (c) upload digital video to the content management system; (d) upload digital audio to the content management system; (e) automated size and resolution processing of digital images uploaded to the system; (f) automated digital format conversion of digital video uploaded to the system; (g) automated digital format conversion of digital audio uploaded to the system; (h) ability for users to select an interactive television screen design (template) from a catalog of available templates; (i) ability to view on a web browser the interactive television template containing the consumer-provided bulletin board content; (j) ability to save bulletin board content in persistent memory or storage for subsequent modification; (k) ability to mark bulletin board content as completed and ready for submission to the interactive television system; (l) ability to specify the date and time when specific bulletin board content is to become accessible by users of the interactive television system and the data and time when specific bulletin board content is to be removed from display on the interactive television system; (m) ability to notify the user through email or other communication system that specific bulletin board content is scheduled to be displayed or removed from the interactive television system; (n) ability to modify and resubmit previously created bulletin board content for display on the interactive television system; (o) ability to access viewing data generated by the Tracking System regarding access and use of specific bulletin board content by users of the interactive television system; and (p) ability to calculate fees for bulletin board content and submit payment of the fees in conjunction with the Transaction Processing component.

The Transaction Processing component allows users of the Classified Content Management System and Bulletin Board Content Management System to determine and pay for any fees resulting from their use of these systems. The Transaction Processing component will allow users to pay for fees using credit cards or other supported payment methods. Significant features of the Transaction Processing component include: (a) ability to maintain business rules for use by the Transaction Processing system to determine fees based on user type and content type; (b) ability to maintain business rules for one or more payment methods for use by the Transaction Processing system in handling the settlement of fees; (c) ability to maintain business rules for user account and payment settlement conditions such as delinquency and lack-of-credit for use by the Transaction Processing system in determining user account privileges and content status; and, (d) ability to process payment of fees in real-time for payment methods that support real-time settlement.

Referring to FIG. 2C, the Content Screening System (41) is comprised of a Text Screening Application 60 which searches for objectionable words or phrases, an Image Screening Application 61 which searches for objectionable graphic images, a Video Screening Application 62 which searches for objectionable images or audio words or phrases in video segments, and an Audio Screening Application 63 which searches for objectionable words or phrases in audio segments. The Content Screening System can be used for both Classified Ads content and Bulletin Board content. Content that has been screened by the Content Screening System is then transferred to the aforementioned Classified Ads Database 51 or the Bulletin Board Content Database 57. The system also has component 64 for Editorial and Customer Service Functions for Classified Ads, and component 65 similarly for Bulletin Board content. These can each include an Email Function to send confirmations of input, reasons for rejection of posting, suggested corrections, further processing, and posting of content to consumers using the system.

Significant features of the Content Screening System include: (a) ability to maintain a library of objectionable or illegal words and phrases for use in the screening of text; (b) ability to perform automated analysis of user content text using the text library as an input and alert system administration personnel to the use of objectionable or illegal content and the use of unknown and suspect words or phrases; (c) ability to maintain a library of objectionable or illegal image elements for use in the screening of images; (d) ability to perform automated image recognition analysis against user content images using the library of image elements as an input and alert system administration personnel to the use of objectionable or illegal content; (e) ability to maintain a library of objectionable or illegal image elements for use in the screening of video; (f) ability to perforin automated image recognition analysis against user content video using the library of image elements as an input and alert system administration personnel to the use of objectionable or illegal content; (g) ability to maintain a library of objectionable or illegal audio elements for use in the screening of audio; (h) ability to perform automated audio analysis against user content audio using the library of audio elements as an input and alert system administration personnel to the use of objectionable or illegal content; and (i) ability to save screened content in persistent memory or storage for subsequent processing. Content Screening is automatically performed with the Content Management System 40 daring the user process of submitting and/or creating consumer-generated content or may be performed as a process subsequent to the creation of content by the user.

Referring to FIG. 2D, the Content Feed System 42 and the Content Conversion System 43 provide for the transfer of user content from the Content Screening System and conversion to video content format compatible with the VOD Content Delivery System 44. The Content Feed System 42 has a Content Selection/Date Filtering Application which selects consumer-generated content uploaded to the system that is within the dates contracted for posting and display of the content as Classified Ads or on Bulletin Boards. Content within the active date range is transferred to the Active Classified Ads Database 71A or the Active Bulletin Board Database 71B.

The Content Conversion System receives consumer-generated content in industry-standard formats or created in viewable format (HTML) on the web-based input system and converts the content into formats compatible with the VOD Content Delivery System and for display on viewers' televisions. The Content Conversion System 43 has an Image Conversion Application 72 which converts consumer-uploaded image files (in industry-standard formats such as JPEG, GIF, TIFF, BMP, PDF, PPT, etc.) into VOD content format, a Video Conversion Application 73 which converts consumer-uploaded video files into VOD content format, and an Audio Conversion Application 74 which converts consumer-uploaded audio files into VOD content format. Content converted to VOD content format is stored in the Active Converted Classified Ads Database 75A or the Active Converted Bulletin Board Database 75B. The content is subject to a further Production Push Function 76A, 76B and stored in the Production Classified Ads Database 77A or the Production Bulletin Board Database 77B, if any presentation formatting, date stamping, template framing, or other system editing is required by the system.

Significant features of the Content Feed System include: (a) ability to select user content for submission to the Content Conversion System through the testing of appropriate parameters including the date and time information contained in the user content; (b) ability to appropriately package the elements of the user content to permit the efficient transfer of these content elements to the Content Conversion System through an Application Program Interface or other interface; (c) ability to create, maintain and execute a schedule for when the Content Feed System will execute on an automatic basis for the automatic transfer of consumer-generated content to the Content Conversion System; and, (d) ability to execute the functions of the Content Feed System on a manual basis in the presence or absence of a schedule. The Content Feed System may be able to package and distribute content to single or multiple Content Conversion Systems.

Significant features of the Content Conversion system include: (a) ability to receive content packages delivered by the Content Feed System through an Application Program Interface or other interface; (b) ability to process the elements of consumer-generated content into data, text, graphic, video and audio elements that are compatible with the interactive television system and maintain the content presentation created by the user on the web-based Content Management System; (c) ability to save reformatted content in persistent memory or storage for subsequent distribution and use by the interactive television system; and, (d) ability to inform the interactive television system that consumer-generated content is available for distribution and use. The Content Conversion System may be added as a component system of the VOD Content Delivery System, or it may be implemented as a wholly separate system that connects to the VOD Content Delivery System through an Application Program Interface or other interface. When implemented as a system that is separate from the VOD Content Delivery System, it is possible to support multiple, different interactive television systems by either (a) incorporating multiple formatting requirements into a single instance of the Content Conversion System or (b) creating multiple Content Conversion Systems, each supporting the formatting requirements for a specific interactive television system. Either implementation allows for a single instance of consumer-generated content that is created and maintained using the web-based Content Management System to be distributed and displayed on multiple, different interactive television systems with different formatting requirements.

The VOD Content Delivery System 44, as described previously, provides for the distribution of screened, converted, properly formatted consumer-generated content to viewers' televisions, typically through the use of digital set-top boxes connected to a digital cable television system capable of supporting real-time two-way data transfer between the set-top box and the Cable Head End. Significant features of the VOD Content Delivery System include: (a) ability to receive properly formatted content from the Content Conversion System; (b) ability to distribute said content over a digital cable television system and display this content on television as an interactive television presentation; (c) ability to receive user commands generated by an infrared remote control device, keyboard or other device; (d) ability to respond to the user commands by displaying appropriate content or executing desired functionality; and, (e) ability to generate and collect data regarding the user sessions and the viewing data regarding consumer-generated content on the interactive television system and make this data accessible to the Tracking System. The VOD Content Delivery System can employ templatized VOD content delivery, as described previously with respect to FIG. 1A, enabling use of the Drill Down Navigation method in which viewers can navigate visually through classified ad hierarchical categories to specific titles or content.

The VOD Content Delivery System for the Classified Ads application can also employ the Tracking System 15 for the collection and consolidation of viewing data generated by the interactive television system and the generation of reports against this viewing data. For example, the Tracking System can track the number of viewer requests for viewing that a classified ad received in a given period and calculate billing charges accordingly. The Tracking System can make this information available to users of the Content Management System as well as to system administrative personnel performing general analysis of interactive television services and associated content. Significant features of the Tracking System include: (a) ability to access and process the data generated by the Classified Ads application; (b) ability to form summaries of the viewing data against desired parameters; (c) ability to save data, summaries and reports in persistent memory or storage for subsequent modification or access; (d) ability to make data, summaries and reports accessible by users of the web-based Content Management System, restricting the data accessible by any specific user to data regarding the content created by that user account on the Content Management System; and, (e) ability to make data, summaries and reports accessible by to system administration personnel.

It is understood that many modifications and variations may be devised given the above description of the principles of the invention. It is intended that all such modifications and variations be considered as within the spirit and scope of this invention, as defined in the following claims.

The invention claimed is:

1. A method for web-based content management for use with one or more computers, comprising:
   (a) receiving, at the one or more computers from a content provider device via the Internet, at least the following digital content:
      (i) a video content, along with
      (ii) respective content-characterizing data comprising:
         (1) respective title information comprising a respective title,
         (2) respective content provider designated hierarchically arranged category information and subcategory information to specify a location of the respective title information for the video content in an interactive user interface of a predetermined video-on-demand application offered by a digital television service provider system, said content provider designated category and subcategory information associated with the respective title information of the video content using a same hierarchical structure of categories and subcategories for placement of the respective title information of associated video content as is to be used in the interactive user interface of the predetermined video-on-demand application;
   (b) screening by the one or more computers the video content for objectionable content to determine whether to include in the interactive user interface or reject from inclusion the video content; and, if the screening of the video content determines that the video content is to be included, performing the following additional steps comprising:
   (c) encoding, at the one or more computers, the video content to an encoded video content file in a format capable of playback on the predetermined video-on-demand application;
   (d) generating, at the one or more computers, associated video-on-demand application-readable metadata for the encoded video content file by converting at least a portion of the content-characterizing data into a format readable by the predetermined video-on-demand application so that the associated metadata can be used with the encoded video content file in order to specify the respective title and the location of the respective title of the encoded video content in the interactive user interface of the predetermined video-on-demand application to present the respective title information in a hierarchical ordering according to the received content provider designated hierarchically arranged category information and subcategory information so that the video content is locatable by a television user when using the predetermined video-on-demand application; and
   (e) transmitting, by the one or more computers, directly or indirectly, the encoded video content file and the associated video-on-demand application-readable metadata from a web-based content management system to the predetermined video-on-demand application for inclusion at the specified location in the hierarchical ordering.

2. The method of claim 1, wherein the step of screening the video content for objectionable content comprises screening the video content for at least one of objectionable text, objectionable audio, objectionable video, or objectionable images.

3. The method of claim 1, further comprising: establishing, by the one or more computers, a schedule when the encoded video content file and the associated video-on-demand application-readable metadata is to be delivered to the video-on-demand application.

4. The method of claim 3, wherein the associated video-on-demand application-readable metadata further comprises time information for availability of the encoded video file for scheduling of viewing of the encoded video content file through the predetermined video-on-demand application.

5. The method of claim 1, further comprising: using the video-on-demand application to display the encoded video content file on a television display.

6. The method of claim 1, further comprising: receiving additional data comprising images and text for packaging the encoded video content file and the associated video-on-demand application-readable metadata into a data package for transmission to the predetermined video-on-demand application, and using the additional data for generating the data package.

7. The method of claim 1, further comprising: performing size and resolution processing.

8. A method for web-based content management for use with one or more computers, comprising:
   (a) receiving, at the one or more computers from a content provider device via the Internet, at least the following digital content:
      (i) a video content, along with
      (ii) respective content-characterizing data comprising:
         (1) respective title information comprising a respective title,
         (2) respective content provider designated hierarchically arranged category information and subcategory information to specify a location of the respective title information for the video content in an interactive user interface of a predetermined video-on-demand application offered by a digital television service provider system, said content provider designated category and subcategory information associated with the respective title information of the video content using a same hierarchical structure of categories and subcategories for placement of the respective title information of associated video content as is to be used in the interactive user interface of the predetermined video-on-demand application;
   (b) screening by the one or more computers the video content for illegal content to determine whether to include in the interactive user interface or reject from inclusion the video content; and, if the screening of the video content determines that the video content is to be included, performing the following additional steps comprising:
   (c) encoding, at the one or more computers, the video content to an encoded video content file in a format capable of playback on the predetermined video-on-demand application;
   (d) generating, at the one or more computers, associated video-on-demand application-readable metadata for the encoded video content file by converting at least a portion of the content-characterizing data into a format readable by the predetermined video-on-demand application so that the associated metadata can be used with the encoded video content file in order to specify the respective title and the location of the respective title of the encoded video content in the interactive user interface of the predetermined video-on-demand application to present the respective title information in a hierarchical ordering according to the received content provider designated hierarchically arranged category information and subcategory information so that the video content is locatable by a television user when using the predetermined video-on-demand application; and (e) transmitting, by the one or more computers, directly or indirectly, the encoded video content file and the associated video-on-demand application-readable metadata from the web-based content management system to the predetermined video-on-demand application for inclusion at the specified location in the hierarchical ordering.

9. The method of claim 8, wherein the step of screening the video content for illegal content comprises screening the video content for at least one of illegal text, illegal audio, illegal video, or illegal images.

10. The method of claim 8, further comprising: establishing, by the one or more computers, a schedule when the encoded video content file and the associated video-on-demand application-readable metadata are to be delivered to the video-on-demand application.

11. The method of claim 10, wherein the associated video-on-demand application-readable metadata further comprises time information for availability of the encoded video file for scheduling of viewing of the encoded video content file through the predetermined video-on-demand application.

12. The method of claim 8, further comprising: using the video-on-demand application to display the encoded video content file on a television display.

13. The method of claim 8, further comprising: receiving additional data comprising images and text for packaging the encoded video content file and the associated video-on-demand application-readable metadata into a data package for transmission to the predetermined video-on-demand application, and using the additional data for generating the data package.

14. The method of claim 8, further comprising: performing size and resolution processing.

* * * * *